(12) United States Patent
Shidla et al.

(10) Patent No.: US 7,213,170 B2
(45) Date of Patent: May 1, 2007

(54) OPPORTUNISTIC CPU FUNCTIONAL TESTING WITH HARDWARE COMPARE

(75) Inventors: Dale John Shidla, Roseville, CA (US); Andrew Harvey Barr, Roseville, CA (US); Ken Gary Pomaranski, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 534 days.

(21) Appl. No.: 10/659,079

(22) Filed: Sep. 10, 2003

(65) Prior Publication Data
US 2005/0055608 A1    Mar. 10, 2005

(51) Int. Cl.
*G06F 11/00*     (2006.01)
(52) U.S. Cl. .................. 714/30; 714/25; 714/33; 714/37
(58) Field of Classification Search .............. 714/25, 714/30, 33
See application file for complete search history.

(56) References Cited

U.S. PATENT DOCUMENTS

| | | | | |
|---|---|---|---|---|
| 4,916,696 A | * | 4/1990 | Funakubo | 714/11 |
| 5,195,101 A | * | 3/1993 | Guenthner et al. | 714/49 |
| 5,202,975 A | * | 4/1993 | Rasbold et al. | 717/151 |
| 5,396,618 A | * | 3/1995 | Fukui et al. | 714/30 |
| 5,530,804 A | * | 6/1996 | Edgington et al. | 714/30 |
| 5,640,508 A | * | 6/1997 | Fujiwara et al. | 714/30 |
| 5,732,209 A | * | 3/1998 | Vigil et al. | 714/30 |
| 5,819,088 A | * | 10/1998 | Reinders | 717/149 |
| 5,835,776 A | * | 11/1998 | Tirumalai et al. | 717/161 |
| 5,838,692 A | * | 11/1998 | Tobin | 714/724 |
| 5,838,897 A | * | 11/1998 | Bluhm et al. | 714/30 |
| 6,134,675 A | * | 10/2000 | Raina | 714/37 |
| 6,289,300 B1 | * | 9/2001 | Brannick et al. | 703/28 |
| 6,385,755 B1 | * | 5/2002 | Shimomura et al. | 714/819 |
| 6,408,377 B2 | * | 6/2002 | Munson | 712/215 |
| 6,434,712 B1 | * | 8/2002 | Urban et al. | 714/12 |
| 6,553,530 B1 | * | 4/2003 | Kim | 714/738 |
| 6,625,688 B1 | * | 9/2003 | Fruehling et al. | 711/109 |
| 6,640,313 B1 | * | 10/2003 | Quach | 714/10 |
| 2002/0038418 A1 | * | 3/2002 | Shimamura | 712/245 |

(Continued)

FOREIGN PATENT DOCUMENTS

EP    0 260 584 A2    3/1988

(Continued)

OTHER PUBLICATIONS

T.H. Chen, et al. "Concurrent error detection in array multipliers by BIDO" Nov. 1995, pp. 425-430, vol. 142, No. 6, IEE Proc.-Comput. Digit. Tech.

(Continued)

*Primary Examiner*—Scott Baderman
*Assistant Examiner*—Brian Assessor (57) ABSTRACT

One embodiment disclosed relates to a method of providing CPU functional testing. Operations are executed on multiple functional units of a same type in the CPU. The outputs of the multiple functional units are automatically compared. The results of the comparison are checked only for redundant operations. Another embodiment disclosed relates to a microprocessor with built-in functional testing capability. The microprocessor includes multiple functional units of a same type and registers that receive outputs from the multiple functional units. In addition, comparator circuitry is built-in that also receives the outputs from the multiple functional units and compares the outputs to provide functional testing.

17 Claims, 7 Drawing Sheets

U.S. PATENT DOCUMENTS

| | | | |
|---|---|---|---|
| 2004/0039967 A1* | 2/2004 | Park | 714/30 |
| 2005/0055608 A1* | 3/2005 | Shidla et al. | 714/25 |
| 2005/0055674 A1* | 3/2005 | Shidla et al. | 717/131 |
| 2005/0055683 A1* | 3/2005 | Shidla et al. | 717/161 |

FOREIGN PATENT DOCUMENTS

| | | | |
|---|---|---|---|
| GB | 1 409 466 A | 10/1975 | |

OTHER PUBLICATIONS

W. Hahn, et al., "Psuedoduplication of Floating-Point Addition—A Method of Compiler Generated Checking of Permanent Hardware Faults" 1991, pp. 161-165, IEEE VLSI Test Sympo.

Patents Act 1977: Search Report under Section 17 for Application No. GB 0 418 639.1.

* cited by examiner

OPPORTUNISTIC CPU FUNCTIONAL TESTING WITH HARDWARE COMPARE

BACKGROUND OF THE INVENTION

1. Field of the Invention

The present invention relates generally to computer systems. More particularly, the present invention relates to compilers.

2. Description of the Background Art

One conventional solution for providing fault tolerance in digital processing by central processing units (CPUs) involves a computer system with multiple CPUs. For example, the multiple CPUs may be operated in full lockstep to achieve a level of fault-tolerance in their computations. Such a solution is expensive in that it disadvantageously requires additional system hardware and support infrastructure.

Another conventional solution for providing fault tolerance in digital processing by central processing units (CPUs) involves the use of software verification. The software verification may be performed either by executing the program multiple times on the same computer or on different computers. However, this solution is expensive in that it disadvantageously requires a longer run-time or requires multiple computers.

The above-discussed conventional solutions are expensive in terms of cost and/or system performance. Hence, improvements in systems and methods for providing fault tolerant digital processing by CPUs are highly desirable.

SUMMARY

One embodiment of the invention pertains to a method of providing CPU functional testing. Operations are executed on multiple functional units of a same type in the CPU. The outputs of the multiple functional units are automatically compared. The results of the comparison are checked only for redundant operations.

Another embodiment of the invention relates to a microprocessor with built-in functional testing capability. The microprocessor includes multiple functional units of a same type and registers that receive outputs from the multiple functional units. In addition, comparator circuitry is built-in that also receives the outputs from the multiple functional units and compares the outputs to provide functional testing.

DETAILED DESCRIPTION

As discussed above, prior systems and methods for fault-tolerant digital processing by CPUs have various disadvantages. The present invention relates to systems and methods for improving the reliability of computations performed by a CPU.

As more and more transistors are put on integrated circuits with smaller and smaller feature sizes and lower voltage levels, the need for on-chip fault tolerance features is increased. Typically, error correction coding may be used to detect and correct errors. Unfortunately, it is difficult to fully apply error correction coding for CPU execution units such as arithmetic logic units (ALUs) and floating point units (FPUs).

Figure 1:
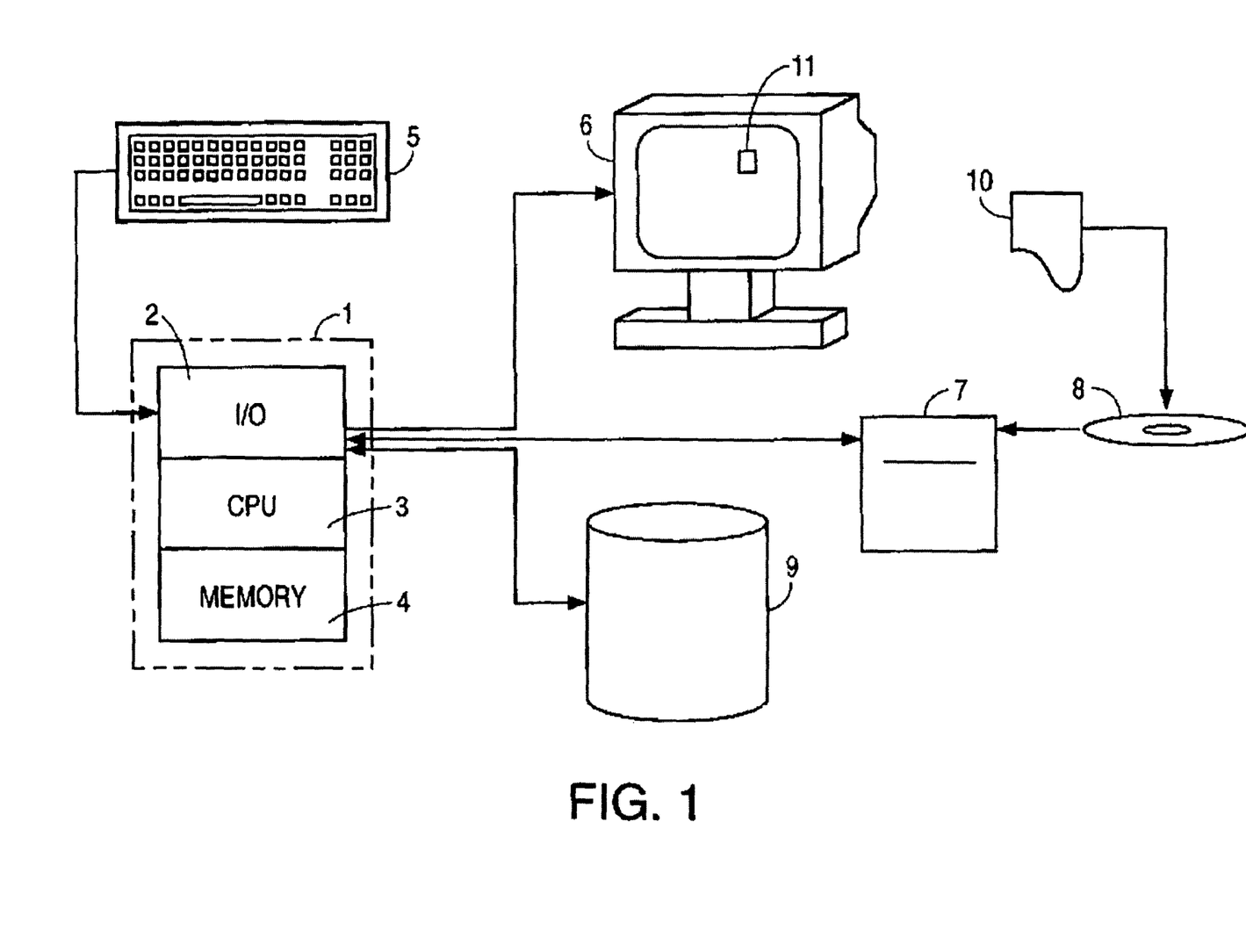
FIG. 1 illustrates a portion of a computer, including a CPU and conventional memory in which the presentation may be embodied.

The environment in which the present invention is used encompasses the general distributed computing system, wherein general-purpose computers, workstations, or personal computers are connected via communication links of various types, in a client-server arrangement, wherein programs and data, many in the form of objects, are made available by various members of the system for execution and access by other members of the system. Some of the elements of a general-purpose computer are shown in FIG. 1, wherein a computing system 1 is shown, having an Input/output ("I/O") section 2, a microprocessor or central processing unit ("CPU") 3, and a memory section 4. The I/O section 2 is connected to a keyboard and/or other input devices 5, a display unit and/or other output devices 6, one or more fixed storage units 9 and/or removable storage units 7. The removable storage unit 7 can read a data storage medium 8 that typically contains programs 10 and other data.

Figure 2:
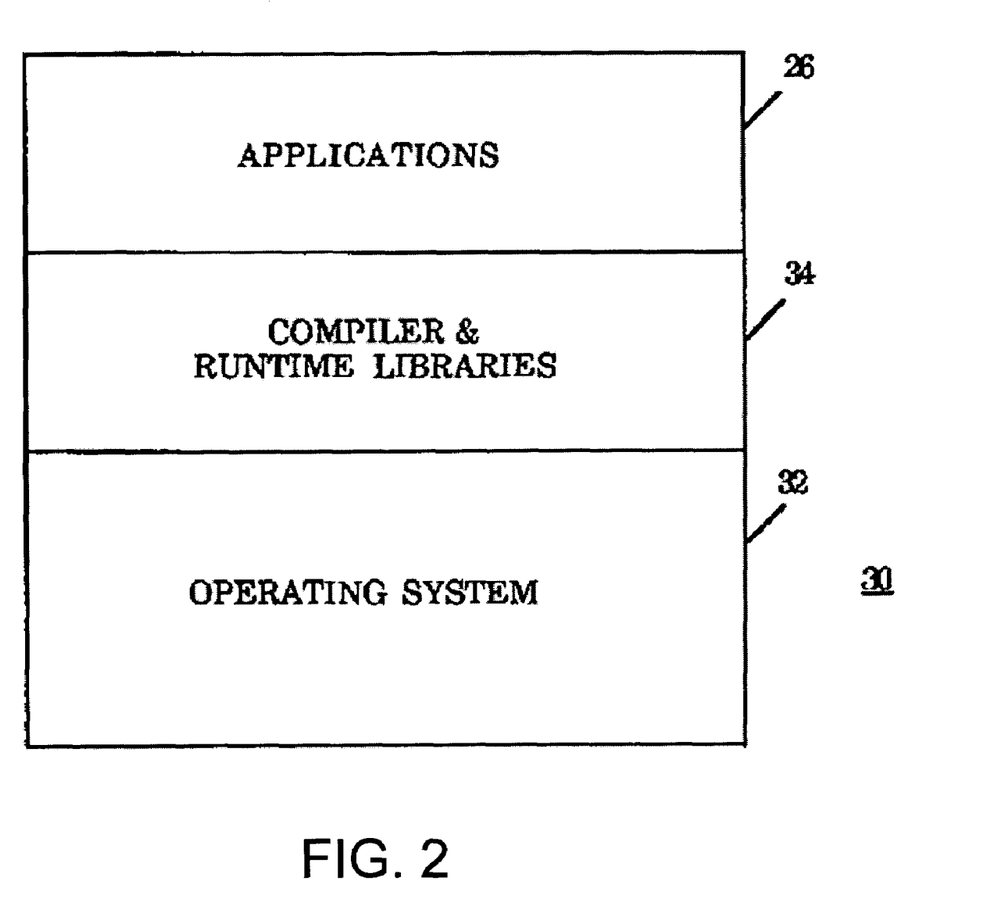
FIG. 2 illustrates example software elements of the illustrative computer system of FIG. 1.

FIG. 2 illustrates example software elements of the illustrative computer system of FIG. 1. Shown are application programs 26. Such applications 26 may be compiled using a compiler 34 incorporated with the teachings of the present invention. The compiled application programs 26 access the runtime libraries 34 for services during execution, which in turn access the operating system 32 for system services. The compiler 34 also accesses the operating system 32 for system services during compilation of application programs 26.

A compiler 34 incorporating the teachings of the present invention may comprise either a native compiler running on the target microprocessor system, or a cross compiler running on a different microprocessor system. In accordance with an embodiment of the invention, the target microprocessor for the compiler has multiple functional units of the same type. For example, the microprocessor may comprise one with a superscalar architecture.

Figure 3A:
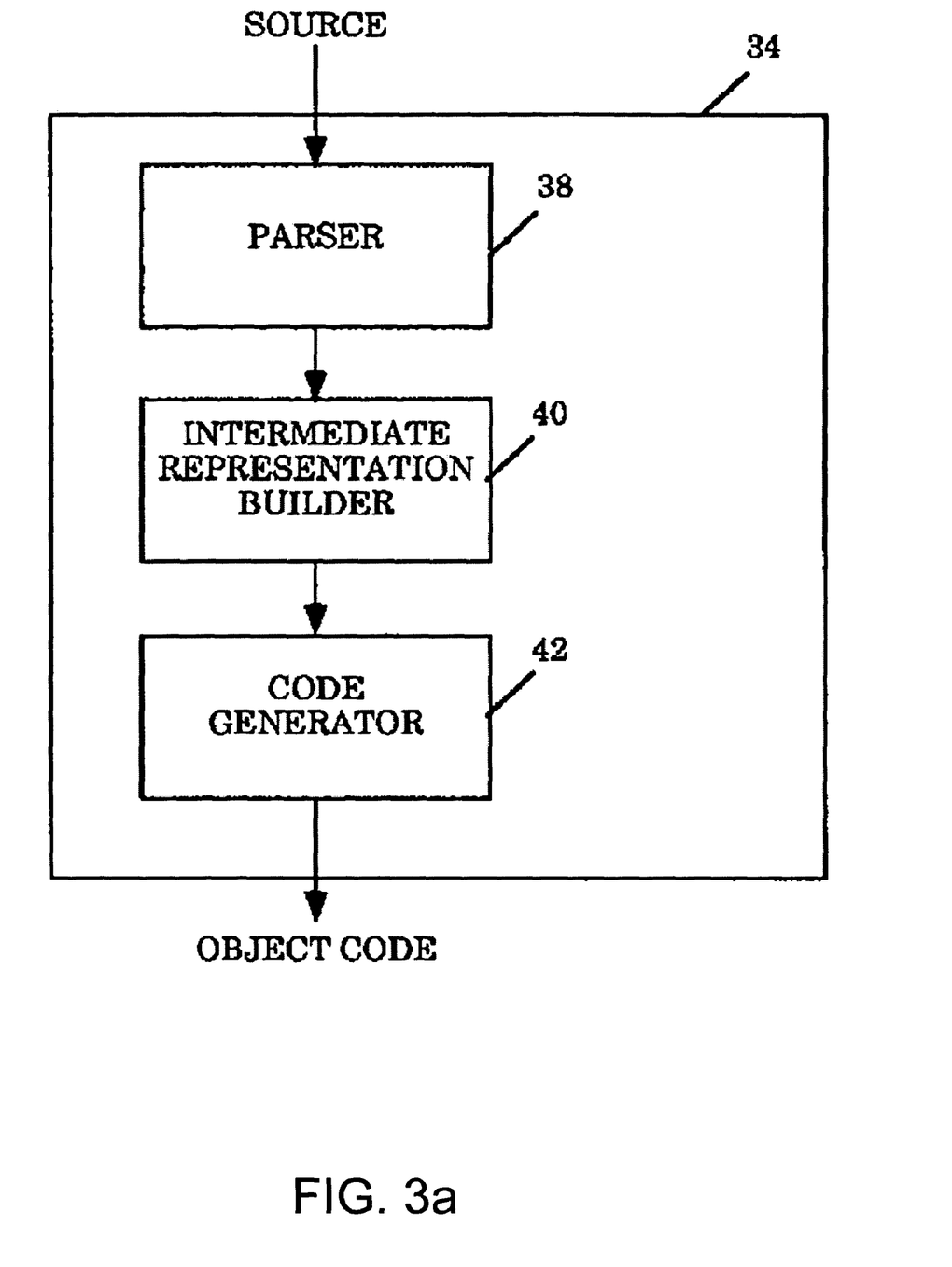
FIG. 3a is a block diagram illustrating components of a compiler in one example.
Figure 3B:
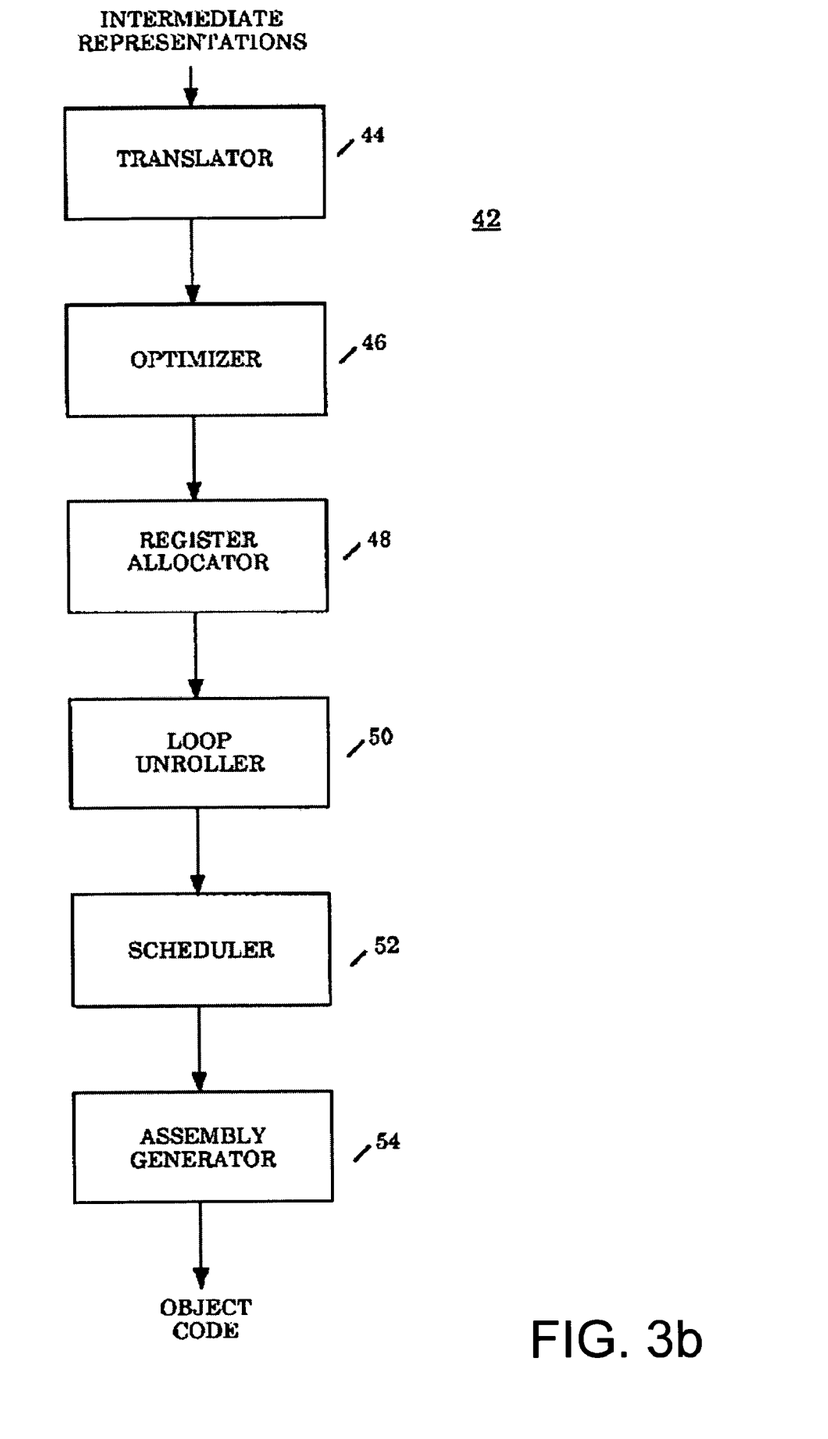
FIG. 3b is a block diagram illustrating components of a code generator in one example.

Referring now to FIGS. 3a and 3b, these block diagrams illustrate one embodiment of a compiler. As illustrated in FIG. 3a, in this embodiment, the compiler 34 comprises a parser 38, an intermediate representation builder 40, and a code generator 42 incorporated with the teachings of the present invention. The parser 38 receives the source code of a program to be compiled as inputs. In response, it parses the source language statements and outputs tokenized statements. The intermediate representation builder 40 receives the tokenized statements as inputs. In response, it constructs intermediate representations for the tokenized statements. The code generator 42 receives the intermediate representations as inputs. In response, it generates object code for the program. The compiler 34 may be configured differently in accordance with other embodiments.

As illustrated in FIG. 3b, in this embodiment, the code generator 42 is configured to include a translator 44, an optimizer 46, a register allocator 48, a loop unroller 50, a scheduler 52, and an assembly code generator 54. The translator 44 receives the intermediate representations as inputs. In response, the translator 44 builds the loop table, orders instruction blocks, constructs data flow graphs etc. The optimizer 46 receives the intermediate representations and associated information as inputs, including the loop table and the data flow graph. In response, it performs various optimizations. The register allocator 48 receives the optimized intermediate representations and associated information as inputs. In response, it allocates registers of the target microprocessor to the instructions being generated. The loop unroller 50 receives the optimized intermediate representations with allocated registers and associated information as inputs. In response, it restructures the instructions being generated, unrolling loops in the instructions being generated for an optimal amount of time consistent with the resources available in the target microprocessor. The scheduler 52 receives the restructured intermediate representations and associated information as inputs. In response, it further restructures the instructions to be generated for parallelism. Lastly, the assembly code generator 54 receives the optimized, register allocated, and restructured intermediate representations and associated information as inputs. In response, it generates the object code for the program being compiled. The code generator 42 may be configured differently in accordance with other embodiments.

While for ease of understanding, the code generator 42 is being described with the above described embodiment which allocates registers before unrolling the loops in the instructions being generated and scheduling instructions for parallelism, based on the descriptions to follow, it will be appreciated that the present invention may be practiced with other register allocation, loop unrolling and scheduling approaches having different register allocation, loop unrolling and scheduling order.

Figure 4A:
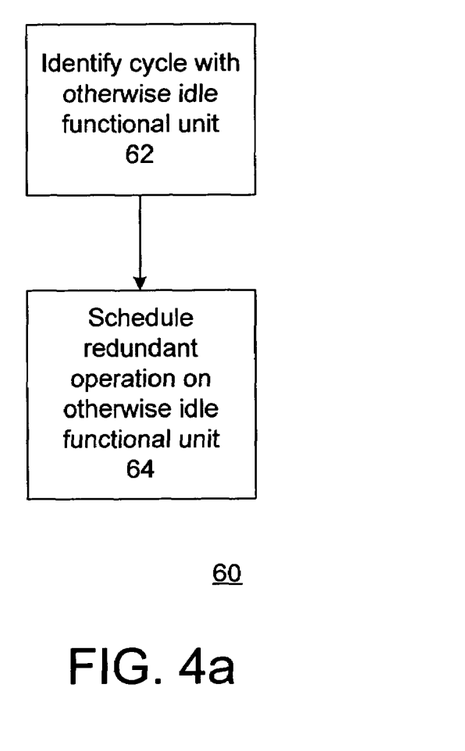
FIG. 4a is a flow chart depicting steps relating to scheduling instructions by a compiler in accordance with an embodiment of the invention.

FIG. 4a is a flow chart depicting steps relating to scheduling instructions by a compiler in accordance with an embodiment of the invention. The method of FIG. 4a may be utilized in a microprocessor or central processing unit (CPU) with multiple functional units of the same type. For example, the CPU may have multiple arithmetic logic units (ALUs) or multiple floating point units (FPUs).

Conventionally, it is a function of the compiler scheduler to keep all of these units as busy as possible. Nevertheless, there will be cycles when a unit will be idle or perform a no-op (no operation).

In accordance with an embodiment of the invention, per the method 60 of FIG. 4a, identification 62 is made of such a cycle in which a functional unit would be idle. Instead of letting the unit be idle, the compiler schedules 64 a redundant operation into that idle unit to provide opportunistic fault checking of the function. If more fault checking is desired by the user, a 'slider' can be set in the compiler by the user to more aggressively use the hardware comparator. As an example, suppose the slider could be set to any value from 0 to 10. A value of '0' could mean to only schedule compares when functional units would otherwise be idle. A value of '10' could mean to use all idle cycles, plus force all FPU/ALU instructions to be redundant. The higher the level of aggressiveness, the greater the level of fault checking provided (at the cost of performance). Other mechanisms may also be used to set the various levels of aggressiveness of the compiler.

For example, consider a CPU with two floating point units, FP_A and FP_B. Most of the time, both units may be scheduled to operate independently, and the comparison flag need not be checked. However, the compiler may be able to schedule an operation for FP_A for a given cycle, but there may not be another operation available for scheduling on FP_B for that cycle. In accordance with an embodiment of the invention, the compiler would identify 62 this opportunity and schedule 64 the same operation for both FP_A and FP_B.

Figure 4B:
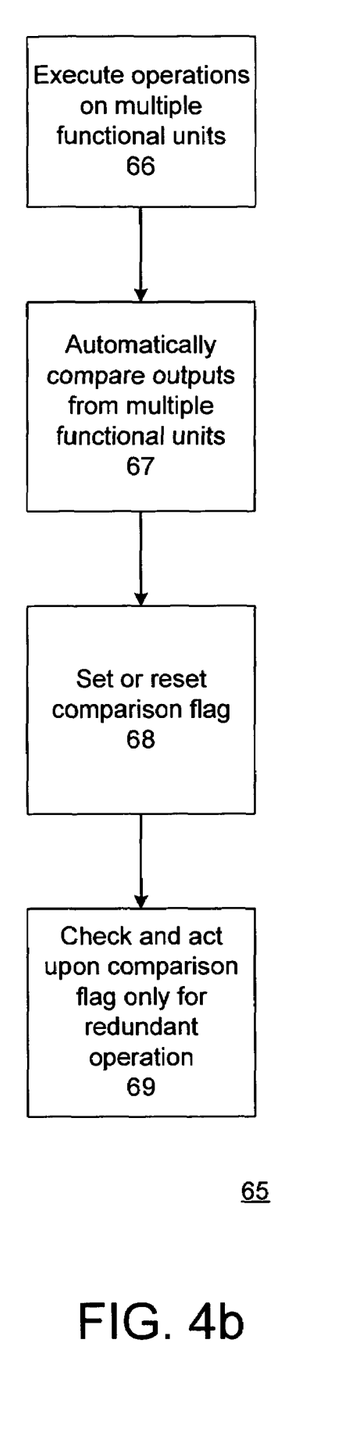
FIG. 4b is a flow chart depicting steps during execution of a compiled program in accordance with an embodiment of the invention.

FIG. 4b is a flow chart depicting steps during execution of a compiled program in accordance with an embodiment of the invention. Per the method 65 of FIG. 4b, operations are executed 66 by multiple functional units within the CPU. In accordance with an embodiment of the invention, these operations are scheduled by the compiler. Normally, different operations are scheduled for execution on the multiple functional units during a cycle. Occasionally, as described above, the intelligent scheduler opportunistically schedules an operation to be redundantly performed for purposes of fault checking.

The outputs from the multiple functional units are automatically compared 67 against each other by comparator circuitry within the target microprocessor. A comparison flag is set or reset 68 based on the resulting output of the comparator circuitry. This occurs for each cycle, regardless of whether different operations or redundant operations are executed on the multiple function units.

However, the comparison flag is to be checked and acted upon 69 only after the execution of such a redundant operation. The comparison flag would not be checked or acted upon after the execution of non-redundant operations because when different operations are performed by the multiple functional units, then the results are expected to be different. In other words, a difference in the results would not normally indicate an error by one of the functional units. However, when a redundant operation is executed on the multiple functional units, then the results are expected to be the same, unless there is an error by one of the functional units.

In the above example, the outputs of FP_A and FP_B may be configured to connect directly to a hardware comparator whose output will be "1" if the two results are the same and "0" if the results are different (or vice versa). During normal operation, when FP_A and FP_B are operating on different data, the output of the comparator would be "0", but this information will not be used. Only when a redundant operation is executed in both FP_A and FP_B will this flag be checked and acted upon if there is an error indicated by a "0" (due to the results being different). While this example cites floating point units, the principle is applicable to any processor resource of which there are multiple copies that are scheduled by the compiler.

In addition, if checking the comparison flag indicates an error by one of the functional units, then there are a variety of ways to deal with the error depending on the level of fault tolerance and performance desired. In accordance with one embodiment, since it is not yet known which functional unit had the error, a possible action would be to halt the CPU and flag the user about the problem. In that embodiment, further diagnostics may be run offline. In other embodiments, more sophisticated algorithms may be utilized. Having the comparison done 'in-line', in hardware, significantly increases the chances of recovery without OS or application interruption.

Figure 5:
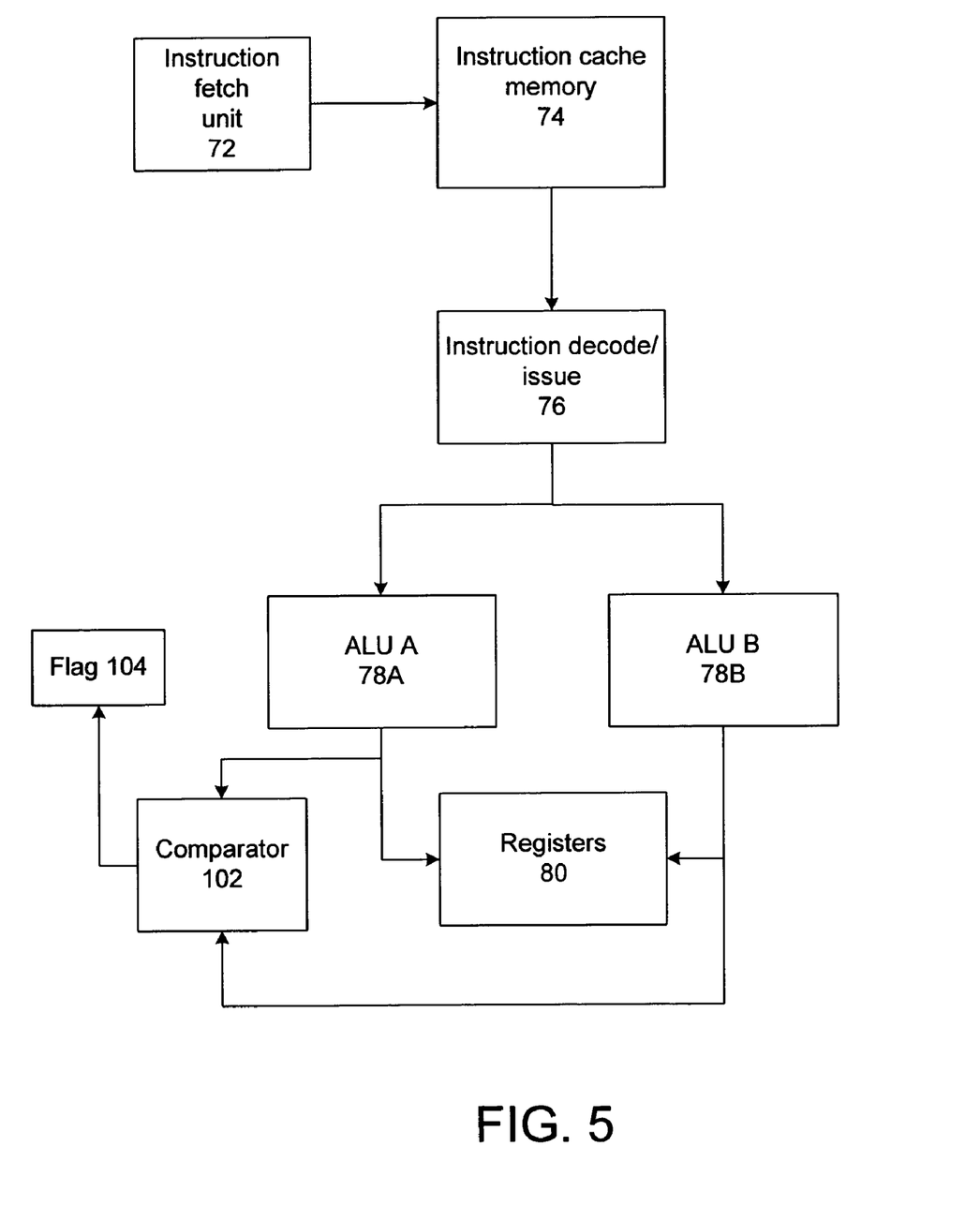
FIG. 5 is a block diagram illustrating select components of a microprocessor with a comparator circuit coupled to multiple arithmetic logic unit outputs in accordance with one embodiment of the invention

FIG. 5 is a block diagram illustrating select components of a microprocessor with a comparator circuit coupled to multiple ALU outputs in accordance with one embodiment of the invention. An actual microprocessor will, of course, have numerous other components that are not illustrated. The components illustrated for explanatory purposes include an instruction fetch unit 72, an instruction cache memory 74, instruction decode/issue circuitry 76, multiple arithmetic logic units (ALUs) 78, registers 80, comparator circuitry 102, and a comparison flag 104. The configuration of these components in FIG. 5 is just one example configuration. While the configuration illustrated has two ALUs 78, embodiments of the invention may also be implemented on microprocessors with more than two ALUs.

The instruction cache 74 stores instructions that are frequently being executed. Similarly, a data cache (not illustrated) may store data that is frequently being accessed to execute the instructions. In some implementations, the instruction and data caches may be combined into one memory. There is also typically access (not illustrated) to dynamic random access memory (DRAM), disk drives, and other forms of mass storage.

Addresses of instructions and memory may be generated by circuitry in the instruction fetch unit 72. For example, the fetch unit 72 may be configured to include a program counter that increments from a starting address within the instruction cache 74 serially through successive addresses in order to serially read out successive instructions stored at those addresses. The instruction decode/issue circuitry 76 receives instructions from the cache 74, and decodes and/or issues them to the ALUs 78 for execution. For example, two separate instructions may be decoded and issued, one to each of two ALUs 78A and 78B, for execution in a particular cycle. The ALUs 78 may be configured to output the results of the execution to specific registers 80 in the microprocessor. In addition, the outputs of the ALUs 78 are configured to be coupled to a comparator circuit 102. The comparator circuit 102 compares its multiple inputs and outputs a value depending on whether the inputs are the same or different. For example, the comparator circuit 102 may output a "1" when its inputs are the same and a "0" digital value when its outputs are different (or vice-versa). Other circuitry, such as that to supply operands for the instruction execution, is not illustrated.

In accordance with an embodiment of the invention, the circuitry of FIG. 5 may be utilized to take advantage of opportunities presented, for example, of a cycle when only one instruction needs to be executed by the two ALUs 78A and 78B. In that situation, the compiler may identify 62 this opportunity and schedule 64 that instruction to be executed redundantly on both ALUs 78.

During execution of the compiled program, the results of the execution on the multiple ALUs 78 are automatically compared 67 by the hardware comparator 102, and the comparison flag 104 is automatically set or reset 68 depending on the output of the comparator 102. However, the comparison flag 104 is checked and acted upon 69 only after the execution of a redundant operation on the multiple ALUs 78.

Figure 6:
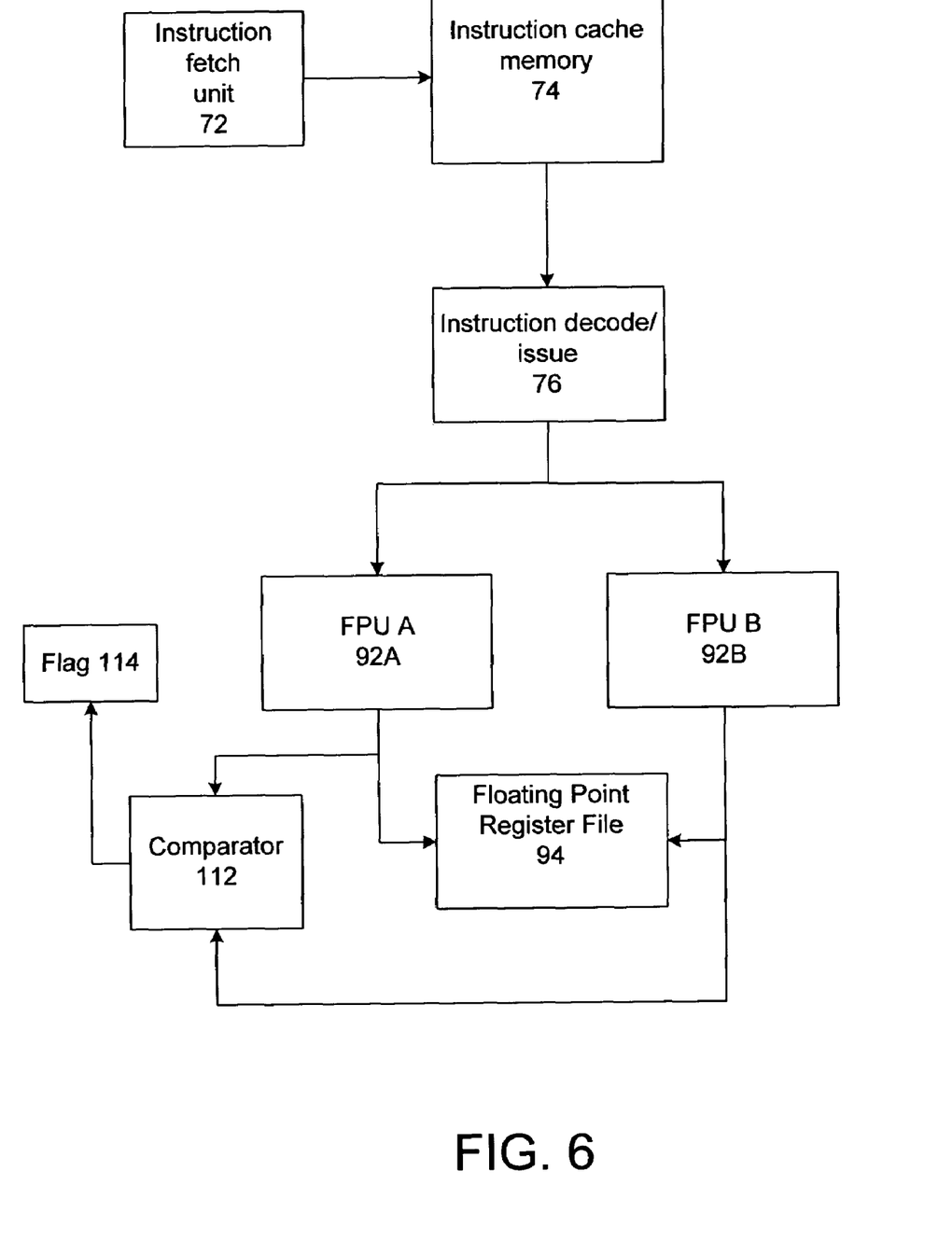
FIG. 6 is a block diagram illustrating select components of a microprocessor with a comparator circuit coupled to multiple floating point unit outputs in accordance with an embodiment of the invention.

FIG. 6 is a block diagram illustrating select components of a microprocessor with a comparator circuit coupled to multiple FPU outputs in accordance with an embodiment of the invention. An actual microprocessor will, of course, have numerous other components that are not illustrated. The components illustrated for explanatory purposes include an instruction fetch unit 72, an instruction cache memory 74, instruction decode/issue circuitry 76, multiple floating point units (FPUs) 92, a floating point register file 94, comparator circuitry 112, and a comparison flag 114. The configuration of these components in FIG. 6 is just one example configuration. While the configuration illustrated has two FPUs 78, embodiments of the invention may also be implemented on microprocessors with more than two FPUs.

The fetch unit 72, instruction cache 74, and the decode/issue unit 76 has the same or similar functionality as described above in relation to FIG. 5. In this instance, the instruction decode/issue circuitry 76 receives floating point type instructions from the cache 74, and decodes and/or issues them to the FPUs 92 for execution. For example, two separate floating point instructions may be decoded and issued, one to each of two FPUs 92A and 92B, for execution in a particular cycle. The FPUs 92 may be configured to output the results of the execution to specific floating point registers 94 in the microprocessor. Other circuitry, such as that to supply operands for the floating point operation execution, is not illustrated.

In accordance with an embodiment of the invention, the circuitry of FIG. 6 may be utilized to take advantage of opportunities presented, for example, of a cycle when only one instruction needs to be executed by the two FPUs 92A and 92B. In that situation, the compiler may identify 62 this opportunity and schedule 64 that instruction to be executed redundantly on both FPUs 92A and 92B.

During execution of the compiled program, the results of the execution on the multiple FPUs 92 are automatically compared 67 by the hardware comparator 102, and the comparison flag 104 is automatically set or reset 68 depending on the output of the comparator 102. However, the comparison flag 104 is checked and acted upon 69 only after the execution of a redundant operation on the multiple FPUs 92.

While FIGS. 5 and 6 describe microprocessor circuitry with multiple ALUs and FPUs, embodiments of the present invention may be utilize other types of functional units as well. These functional units may also comprise resources that may be scheduled by a compiler to take opportunistic advantage of idle cycles to perform fault checking. In addition, the multiple functional units of the same type need not necessarily be identically configured, but they should be configured to each be able to execute at least one same instruction for the above-described fault checking purpose.

Furthermore, while the above examples discuss configurations with two functional units of the same type, other embodiments of the invention may utilize a target microprocessor with three or more functional units of the same type. In the above examples, there are only two functional units of the same type, so only one comparator is needed to compare the outputs of those two functional units. For CPUs that have more than two of any given functional unit, the number of comparators will grow, depending on the availability of area on the chip and the flexibility desired for the compiler to schedule redundant transactions for fault checking. Towards the low end, one comparator may be provided for each pair of functional units. On the other end of the spectrum, every possible pairing of like functional units could be connected to a comparator. For example, with three FPUs (FP_A, FP_B, and FP_C), a lower-end configuration would include two comparators, compare (FP_A, FP_B) and compare (FP_A, FP_C), and a higher-end configuration would include three comparators, adding compare (FP_B, FP_C). As another example, with four FPUs (FP_A, FP_B, FP_C, and FP_D), a lower-end configuration would include two comparators, compare (FP_A, FP_B) and compare (FP_C, FP_D), and a higher-end configuration would include six comparators, adding compare (FP_A, FP_C), (FP_A, FP_D), (FP_B, FP_C), and (FP_B, FP_D).

An embodiment of the invention exploits the fact that latent CPU defects tend to be predictable in advance, as execution units tend to "weaken" over time. Applicants believe that the present invention achieves a level of fault tolerance for the CPU with almost negligible performance impact because a) idle or no-op cycles are utilized through intelligent compiler scheduling to conduct the functional testing and b) the hardware comparator circuitry eliminates a need to otherwise schedule a separate comparison operation for execution.

An embodiment of the invention achieves a level of fault tolerance for a CPU without requiring extra external hardware circuitry. Instead, the fault tolerance is provided by software modification to the compiler and minimal additional circuitry internal to the CPU.

A compiler providing fault checking in accordance with an embodiment of the invention is not limited to a particular CPU architecture. The additional circuitry may be added and the compiler modified for any CPU architecture, provided that the CPU architecture has multiple functional units of the same type that may be scheduled in accordance with an embodiment of the invention.

An embodiment of the present invention makes fault tolerant features available on lower-end systems. Previously, such fault tolerant features may have been unavailable on such lower-end systems due to their cost-sensitive nature.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of providing opportunistic functional testing within a central processing unit (CPU), the method comprising:
   executing a computer program having both pre-scheduled redundant and non-redundant operations on multiple functional units of a same type in the CPU;
   automatically comparing outputs from the multiple functional units; and
   checking results of the comparison only for the pre-scheduled redundant operations but not for the pre-scheduled non-redundant operations,
   wherein the pre-scheduled redundant operations are opportunistically scheduled by a compiler during compilation of source code for the computer program and before beginning execution of the computer program to execute redundantly on at least two of the multiple functional units to utilize an otherwise idle cycle for at least one of the multiple functional units for purposes of functional testing, and
   wherein multiple of the pre-scheduled non-redundant operations are scheduled by the compiler during compilation of the source code for the computer program and before beginning execution of the computer program to execute in parallel on the multiple functional units for purposes of performance.

2. The method of claim 1, wherein automatically comparing the outputs from the multiple functional units is performed by comparator circuitry within the CPU that is coupled to receive the outputs.

3. The method of claim 2, further comprising:
   setting a comparison flag based on output of the comparator circuitry.

4. The method of claim 3, wherein checking results of the comparison is performed by examining the comparison flag.

5. The method of claim 4, further comprising:
   if examination of the comparison flag indicates an error, then halting the execution and providing a notification of the error.

6. The method of claim 1, wherein the compiler is configured with various levels of aggressiveness with respect to scheduling of the redundant operations.

7. The method of claim 6, wherein the levels of aggressiveness include levels more aggressive than just taking advantage of otherwise idle functional units.

8. The method of claim 7, wherein a high level of aggressiveness forces all operations on a functional unit to be performed redundantly on another functional unit of the same type.

9. The method of claim 1, wherein the functional units comprise floating point units.

10. The method of claim 1, wherein the functional units comprise arithmetic logic units.

11. A microprocessor with built-in functional testing capability which is controllable per execution cycle, the microprocessor comprising:
    multiple functional units of a same type;
    registers that receive outputs from the multiple functional units; and
    comparator circuitry that also receives the outputs from the multiple functional units and compares the outputs to provide functional testing during pre-scheduled redundant operations but not during pre-scheduled non-redundant operations,
    wherein the pre-scheduled redundant operations are opportunistically scheduled by a compiler during compilation of source code for a computer program and before beginning execution of the computer program to execute redundantly on at least two of the multiple functional units to utilize an otherwise idle cycle for at least one of the multiple functional units for purposes of functional testing, and
    wherein multiple of the pre-scheduled non-redundant operations are scheduled by the compiler during compilation of the source code for the computer program and before beginning execution of the computer program to execute in parallel on the multiple functional units for purposes of performance.

12. The microprocessor of claim 11, wherein the multiple functional units comprise floating point units.

13. The microprocessor of claim 11, wherein the multiple functional units comprise arithmetic logic units.

14. The microprocessor of claim 11, further comprising:
p1 at least one flag coupled to receive results from the comparator circuitry.

15. The microprocessor of claim 14, wherein the flag is ignored if different operations are performed on the multiple functional units and is checked if a same redundant operation is performed on the multiple functional units.

16. A computer-readable program product stored on a computer-readable medium for execution on a target microprocessor with multiple functional units of a same type, the program product comprising executable code that includes a redundant operation pre-scheduled by a compiler during compilation of source code to generate the computer-readable program product and before beginning execution of the computer-readable program product, wherein the redundant operation is pre-scheduled to execute in parallel on two functional units to utilize an otherwise idle cycle for one of the functional units for purposes of functional testing, wherein the program product is configured to execute on a microprocessor having comparator circuitry to automatically compare outputs of the two functional units for the pre-scheduled redundant operation but not for pre-scheduled non-redundant operations.

17. An apparatus for providing opportunistic functional testing within a CPU, the apparatus comprising:

means for executing a computer program having both pre-scheduled redundant and pre-scheduled non-redundant operations on multiple functional units of a same type in the CPU;

means for automatically comparing outputs from the multiple functional units; and means for checking results of the comparison only for the pre-scheduled redundant operations but not for the pre-scheduled non-redundant operations, wherein the pre-scheduled redundant operations are opportunistically scheduled by a compiler during compilation of source code for the computer program and before beginning execution of the computer program to execute redundantly on at least two of the multiple functional units to utilize an otherwise idle cycle for at least one of the multiple functional units for purposes of functional testing, and wherein multiple of the pre-scheduled non-redundant operations are scheduled by the compiler during compilation of the source code for the computer program and before beginning execution of the computer program to execute in parallel on the multiple functional units for purposes of performance.

* * * * *

UNITED STATES PATENT AND TRADEMARK OFFICE
CERTIFICATE OF CORRECTION

PATENT NO.         : 7,213,170 B2                                   Page 1 of 1
APPLICATION NO.    : 10/659079
DATED              : May 1, 2007
INVENTOR(S)        : Dale John Shidla et al.

It is certified that error appears in the above-identified patent and that said Letters Patent is hereby corrected as shown below:

In column 9, line 8, in Claim 14, delete "p1" before "at least".

Signed and Sealed this

Twenty-second Day of December, 2009

David J. Kappos
*Director of the United States Patent and Trademark Office*